(12) United States Patent
Chen et al.

(10) Patent No.: US 8,971,246 B2
(45) Date of Patent: *Mar. 3, 2015

(54) PACKET RADIO NETWORK AND METHOD

(75) Inventors: Xiaobao Chen, Swindon (GB); Philippe Lucas, Bievres (FR); Martin Barkley Harris, Bristol (GB)

(73) Assignee: Orange SA, Paris (FR)

( * ) Notice: Subject to any disclaimer, the term of this patent is extended or adjusted under 35 U.S.C. 154(b) by 454 days.

This patent is subject to a terminal disclaimer.

(21) Appl. No.: 13/276,276

(22) Filed: Oct. 18, 2011

(65) Prior Publication Data

US 2012/0087360 A1   Apr. 12, 2012

Related U.S. Application Data

(63) Continuation of application No. 11/886,976, filed as application No. PCT/GB2006/001084 on Mar. 23, 2006, now Pat. No. 8,072,923.

(30) Foreign Application Priority Data

Mar. 24, 2005   (EP) .................................... 05290654

(51) Int. Cl.
   *H04W 4/00*     (2009.01)
   *H04W 76/02*    (2009.01)
   *H04W 80/00*    (2009.01)

(52) U.S. Cl.
   CPC ............ *H04W 76/022* (2013.01); *H04W 80/00* (2013.01)
   USPC ............................. 370/328; 370/332; 370/338

(58) Field of Classification Search
   CPC ..... H04W 84/12; H04W 74/08; H04W 80/04; H04W 88/06; H04W 88/18; H04L 2012/64; H04L 65/102; H04L 29/06176; H04L 65/4007; H04L 65/1006; H04L 69/167; H04L 29/06197
   USPC .......................... 370/328, 332, 338, 352, 356
   See application file for complete search history.

(56) References Cited

U.S. PATENT DOCUMENTS

| | | | |
|---|---|---|---|
| 7,145,919 B2 * | 12/2006 | Krishnarajah et al. | 370/474 |
| 7,411,923 B2 * | 8/2008 | Attar et al. | 370/328 |
| 7,460,475 B2 * | 12/2008 | Tourunen et al. | 370/230.1 |
| 7,496,068 B2 * | 2/2009 | Chen | 370/329 |
| 7,522,613 B2 * | 4/2009 | Rotsten et al. | 370/400 |
| 7,554,991 B2 * | 6/2009 | Sbida | 370/395.5 |
| 7,640,017 B2 * | 12/2009 | Chen | 455/437 |
| 7,746,849 B2 * | 6/2010 | Bodin et al. | 370/355 |
| 7,764,651 B2 * | 7/2010 | Kwon et al. | 370/331 |

(Continued)

*Primary Examiner* — Brian O'Connor
(74) *Attorney, Agent, or Firm* — Haverstock & Owens LLP

(57) ABSTRACT

A packet radio network provides a facility for communicating internet packets to and/or from a mobile user equipment. In response to a packet data protocol activation request message requesting a common packet data protocol context, the serving support node is operable in combination with the gateway support node to establish a common packet data protocol context in association with a common packet communications bearer. The common packet data protocol context is established to communicate internet protocol packets via the common packet communications bearer. The common packet communications bearer is shared with at least one other communications session and is formed by the gateway support node and the serving support node using a common tunnelling protocol bearer. Therefore a packet radio network is provided which can provide a common communications bearer which can be shared between different communications sessions.

12 Claims, 11 Drawing Sheets

(56) References Cited

U.S. PATENT DOCUMENTS

| | | | |
|---|---|---|---|
| 7,778,242 B1 * | 8/2010 | Barany et al. | 370/356 |
| 7,907,618 B2 * | 3/2011 | Chen | 370/395.5 |
| 7,961,714 B1 * | 6/2011 | Watson et al. | 370/352 |
| 8,023,946 B2 * | 9/2011 | Chen | 455/437 |
| 8,064,384 B2 * | 11/2011 | Chen et al. | 370/328 |
| 8,072,923 B2 * | 12/2011 | Chen et al. | 370/328 |
| 8,213,418 B2 * | 7/2012 | Watson et al. | 370/352 |
| 8,271,686 B2 * | 9/2012 | Jouppi et al. | 709/246 |
| 8,488,462 B2 * | 7/2013 | Hurtta et al. | 370/235 |
| 2003/0221016 A1 * | 11/2003 | Jouppi et al. | 709/245 |
| 2004/0205247 A1 * | 10/2004 | Ahn | 709/245 |

* cited by examiner

Fig. 6: End User Address Information Element

PDP Type Organisation Values

| PDP Type Organisation | Value (Decimal) |
|---|---|
| ETSI | 0 |
| IETF | 1 |
| All other values are reserved | |

Table 1: ETSI defined PDP Type Values

| PDP Type Number | Value (Decimal) |
|---|---|
| PPP | 1 |
| | |
| All other values are reserved | |

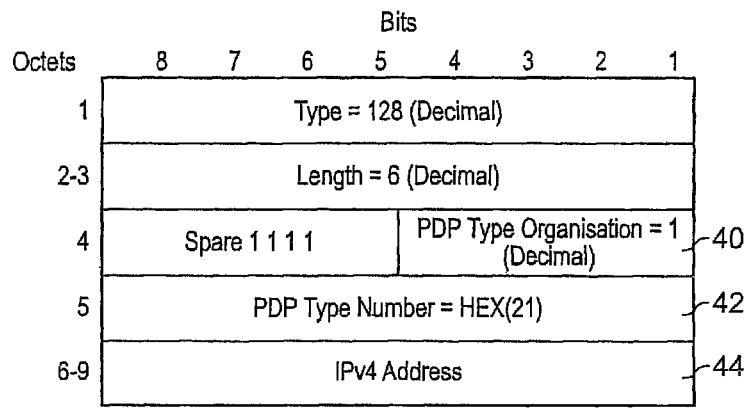
Fig. 8: End User Address Information Element for IPv4
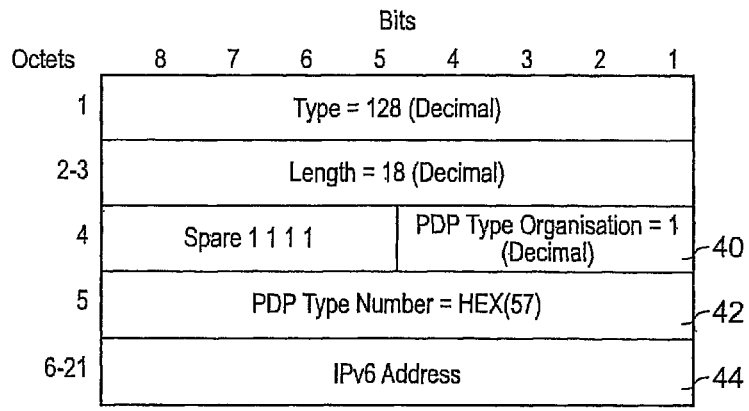
Fig. 9: End User Address Information Element for IPv6

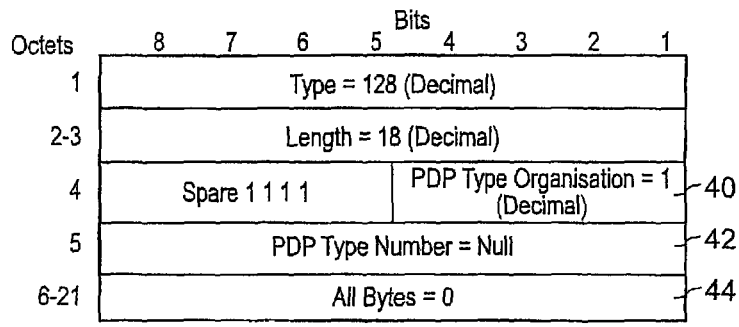
Fig. 10: The End User Address Information Element for Common PDP Context IPv6
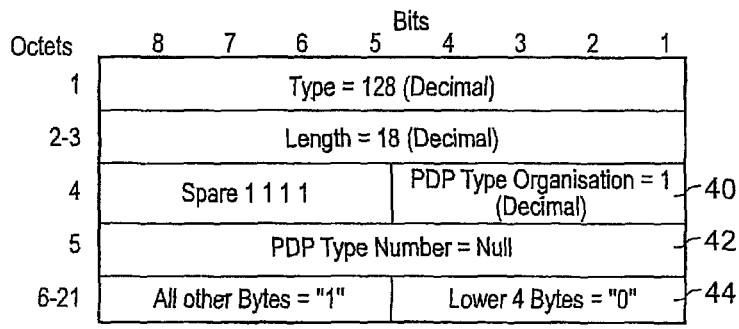
Fig. 11: The End User Address Information Element for Common PDP Context IPv4
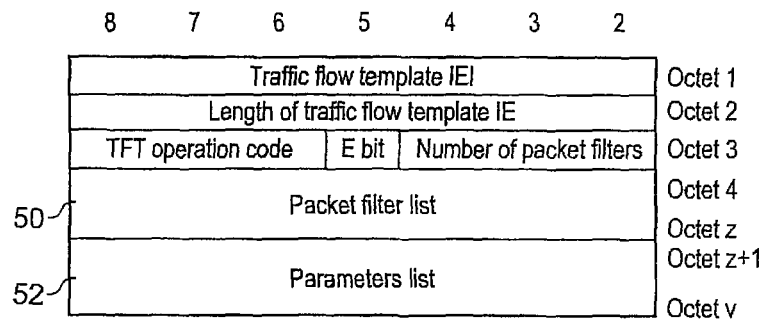
Fig. 12: Traffic Flow Template Information Element

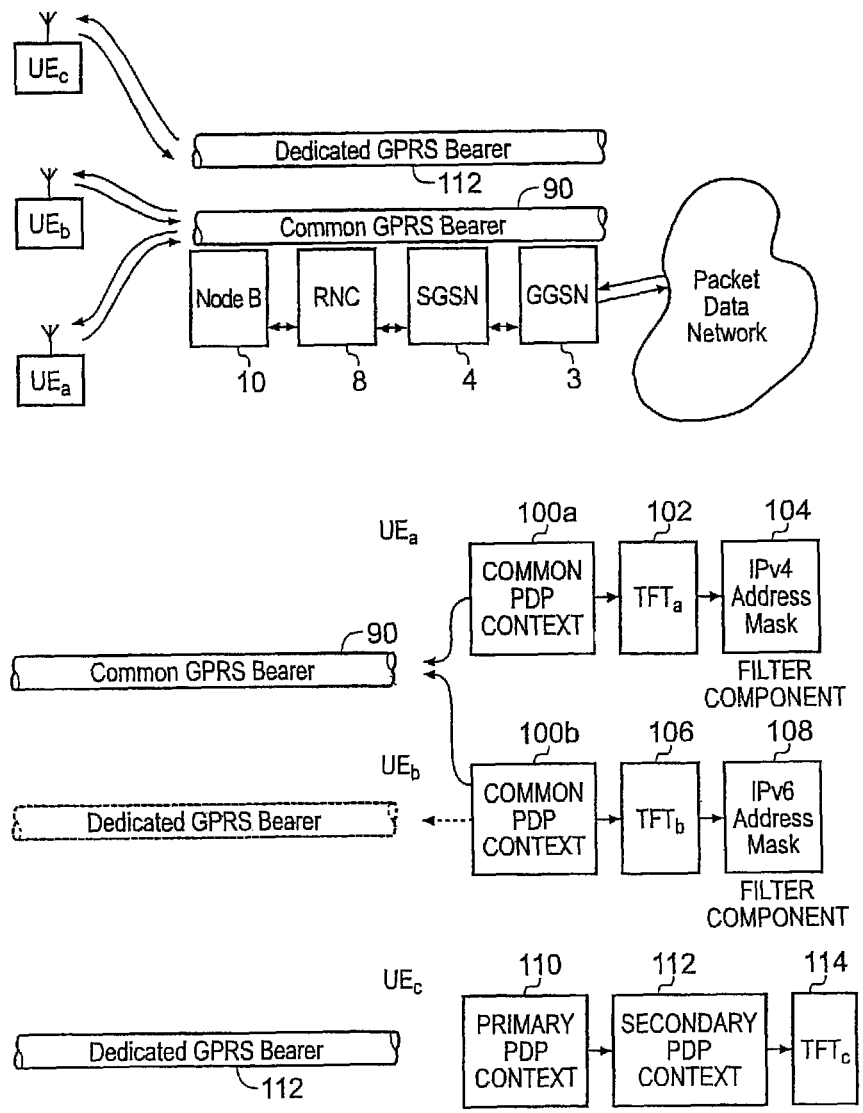
Fig. 13: TFT for Common PDP Context

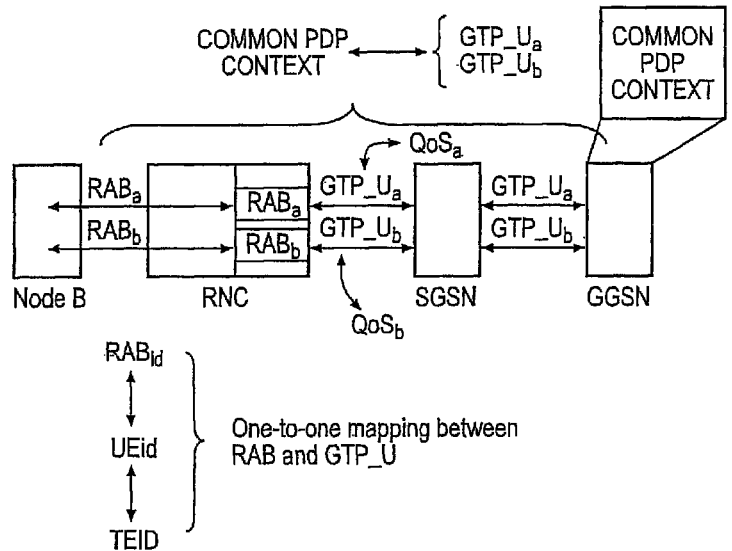
Fig. 14: Common PDP Context Different GPRS Bearer
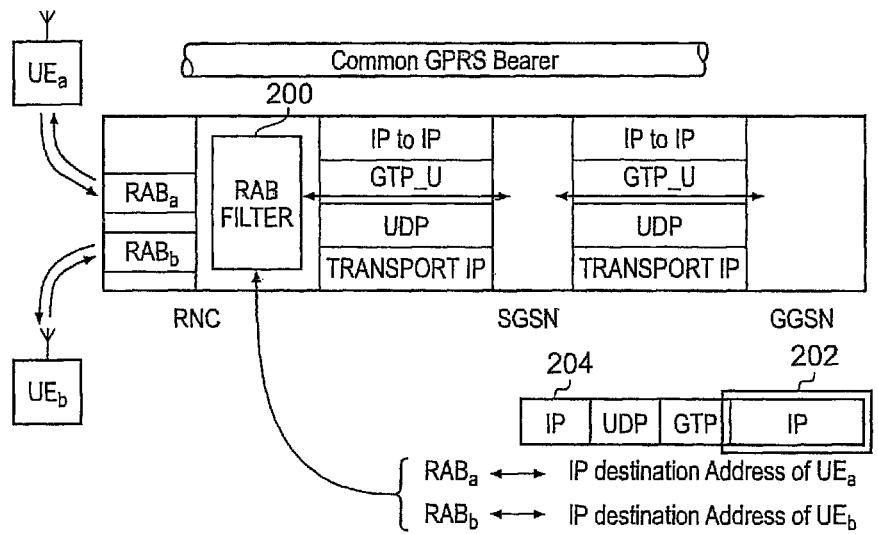
Fig. 15: Common PDP Context Shared GTP_U

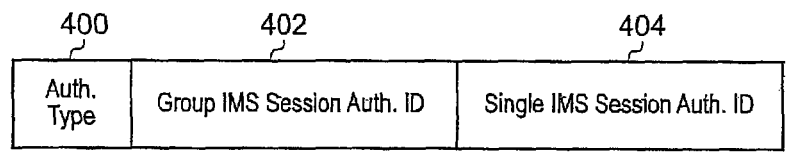
Fig. 19: A Hierarchical Authorisation ID Structure
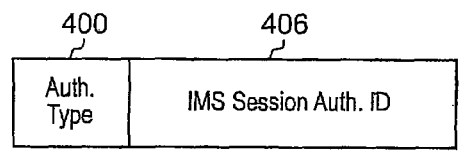
Fig. 20: A Hierarchical Authorisation ID Structure

PACKET RADIO NETWORK AND METHOD

RELATED APPLICATIONS

This patent application is a continuation application of U.S. patent application Ser. No. 11/886,976, filed on Dec. 29, 2008 now U.S. Pat. No. 8, 072,923, and entitled "PACKET RADIO NETWORK AND METHOD," the content of which is incorporated herein by reference in its entirety.

FIELD OF THE INVENTION

The present invention relates to packet radio networks operable to communicate internet protocol packets to and/or from mobile user equipment, such as, for example, a network operating in accordance with the General Packet Radio System (GPRS).

BACKGROUND OF THE INVENTION

The GPRS has been developed to communicate internet packets via a radio access interface. A GPRS network can be formed using a Global System for Mobile communications (GSM) or a Universal Mobile Telecommunications System (UMTS) backbone network. GPRS provides support for packet-orientated services and attempts to optimise network and radio resources for packet data communications such as for example Internet Packets (IP). The GPRS provides a logical architecture, which is related to the circuit switched architecture of a mobile radio system.

In GPRS/UMTS networks, each mobile user equipment needs to set up at least one GPRS/UMTS communications session represented by packet data protocol (PDP) Context, to send and receive data. Each GPRS/UMTS session is specific to the mobile user equipment. As such a mobile user equipment must use its own specific PDP context to send and receive data. In addition, the PDP Context is specific to the type of internet packet data which the mobile user equipment sends through the GPRS/UMTS communications session. There are three different types of PDP Contexts, depending on the type of internet protocol connectivity, which the mobile user equipment has established:

Point-to-point protocol type
Internet protocol version 4 (IPv4) type
Internet protocol version 6 (IPv6) type This internet protocol version specific PDP Context means that a mobile user equipment must set up an IPv4 type of PDP context if it intends to send IPv4 internet packets across the GPRS/UMTS network. Similarly a mobile user equipment must set up an IPv6 type of PDP Context if it is to send and receive IPv6 internet packets across the GPRS/UMTS networks. This can cause an inefficient use of communications resources on the packet radio network.

SUMMARY OF THE INVENTION

According to the present invention there is provided a packet radio network which provides a facility for communicating internet packets to and/or from a mobile user equipment. The packet radio network comprises a gateway support node, a serving support node and a radio network controller. The gateway support node is operable to provide a packet data protocol context for controlling the communication of the internet packets to and/or from the packet radio network from and/or to the mobile user equipment via a packet communications bearer. The serving support node is operable to control communications of the internet packets to and from the gateway support node to and/or from mobile user equipment to form the packet communications bearer. The radio network controller is operable to provide a radio access bearer for communicating the internet packets via a radio access interface to and/or from the mobile user equipment. In response to a packet data protocol activation request message requesting a common packet data protocol context, the serving support node is operable in combination with the gateway support node to establish a common packet data protocol context in association with a common packet communications bearer. The common packet data protocol context is established to communicate internet protocol packets via the common packet communications bearer. The common packet communications bearer is shared with at least one other communications session and is formed by the gateway support node and the serving support node using a common tunnelling protocol bearer, and a packet radio network as claimed in claim 1, wherein the gateway support node is operable to communicate internet protocol packets via the common packet communications bearer for a plurality of communications sessions, at least one of the communications sessions using a different internet protocol version to another of the communications sessions, the common tunnelling protocol bearer being operable to communicate the internet packets for the plurality of communications sessions for the different internet protocol versions via the common packet communications bearer.

With the advancement of new radio access technologies, for example the availability of high-speed radio links technologies such as HSDPA (High Speed Downlink Packet Data) and HSUPA (High Speed Uplink Packet Data), it is desirable to share the same radio bearer between more than one more user equipment to improve the efficiency in resource utilisation. In addition, with the rapid advancement in IPv6 technologies, deployment of IPv6 may become increasingly common in end devices and systems, such as mobile user equipment. Furthermore the presence of existing IPv4 systems prompts the development of mobile user equipment with IPv4/IPv6 dual internet protocol stacks. Conventionally IPv4 packets must be delivered through IPv4 type PDP context while IPv6 packets must be delivered via IPv6 type of PDP Contexts. As a result resources may be utilised less efficiently than could be achieved by sharing the same high-speed/broadband GPRS bearers (e.g. HSDPA/HSUPA being the radio bearers). Moreover, a mobile user equipment with a dual internet protocol IPv4 and IPv6 stack may also need to send both IPv4 and IPv6 packets contemporaneously, for example, for connecting to IPv4 and IPv6-based services, respectively. However, the existing internet protocol type specific packet data protocol context may require that the mobile user equipment set up at least two packet data protocol contexts, one of IPv4 type and the other IPv6 type.

Embodiments of the present invention can provide a packet radio network, which can provide a common communications bearer, which can be shared between different communications sessions. As a result high-speed broadband communications, such as HSDPA, can be supported efficiently because more than one communications session shares common communications resources. As such, a packet radio network according to example embodiments is provided with an arrangement for sharing the same GPRS/UMTS session, using a common packet communications bearer and supported by a common packet data protocol context. Typically, there will be only one common packet communications bearer per gateway support node.

A common PDP context establishes a common packet communications bearer, in accordance with a packet data protocol, for communicating internet packets across a GPRS network. As part of the packet data protocol, policy enforcement, quality of service and routing for example are established in order to arrange for the internet protocol packets to be communicated via the established common packets communications bearer. However, the common PDP context establishes a common packet communications bearer, which is not specific to any internet protocol version and furthermore may be shared between more than one communication session. Furthermore, the communication sessions may be from different mobile user equipment.

Alternatively, in other examples, a common PDP context may be established for more than one communication session although the communication session may use separate internet protocol bearers. Therefore a common PDP Context is defined to be a PDP Context that is common to PPP data frames, IPv4 and IPv6 packets, or packets which are for communication using any other internet protocol version or other data protocols.

For the example of a GPRS/UMTS, a communications session can be established via a GPRS/UMTS network with a common PDP context, the common PDP context establishing a common packet communications bearer, which can be used for transmitting and receiving PPP frames, IPv4 and IPv6 packets as well as any other format of data packets in compliance with a data transport protocol or other internet protocol versions.

Various further aspects and features of the present inventions are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 6 is a schematic representation of an end user address information element submitted as part of the packet data protocol (PDP) context activation;

FIG. 8 is a schematic representation of an end user address information element for establishing an IPv4 PDP context;

FIG. 9 is a schematic representation of an end user address information element for establishing an IPv6 PDP context;

FIG. 10 is a schematic representation of an end user address information element for establishing a common packet data protocol context, wherein the mobile user equipment wishes to communicate using IPv6;

FIG. 11 is a schematic representation of an end user address information element for establishing a common packet data protocol context, wherein the mobile user equipment wishes to communicate using IPv4;

FIG. 12 is a schematic representation of a traffic flow template information element;

FIG. 13 is a schematic representation of the GRSP/UMTS network shown in FIG. 3 illustrating a plurality of mobile user equipment establishing packet data protocol contexts, including common packet data protocol contexts, which can communicate using a common GPRS bearer;

FIG. 14 is a schematic representation of parts of the GPRS/UMTS network of FIGS. 3 and 5, providing separate GPRS bearers to two of the mobile user equipment shown in FIG. 13, which share a common packet data protocol context;

FIG. 15 is a schematic representation of parts of the GPRS/UMTS network of FIGS. 3 and 5, providing a common GPRS bearers for supporting internet protocol communications to and/or from two of the mobile user equipment shown in FIG. 13, which share the common packet data protocol context;

FIG. 19 is a schematic representation of an authorisation token generated as part of the session authorisation procedure represented in FIG. 18, adapted to authorise either a single IMS session or a group IMS session;

FIG. 20 is a schematic representation of a further example of an authorisation token generated as part of the session authorisation procedure represented in FIG. 18, adapted to authorise either a single IMS session or a group IMS session.

DESCRIPTION OF THE PREFERRED EMBODIMENTS

Figure 1:
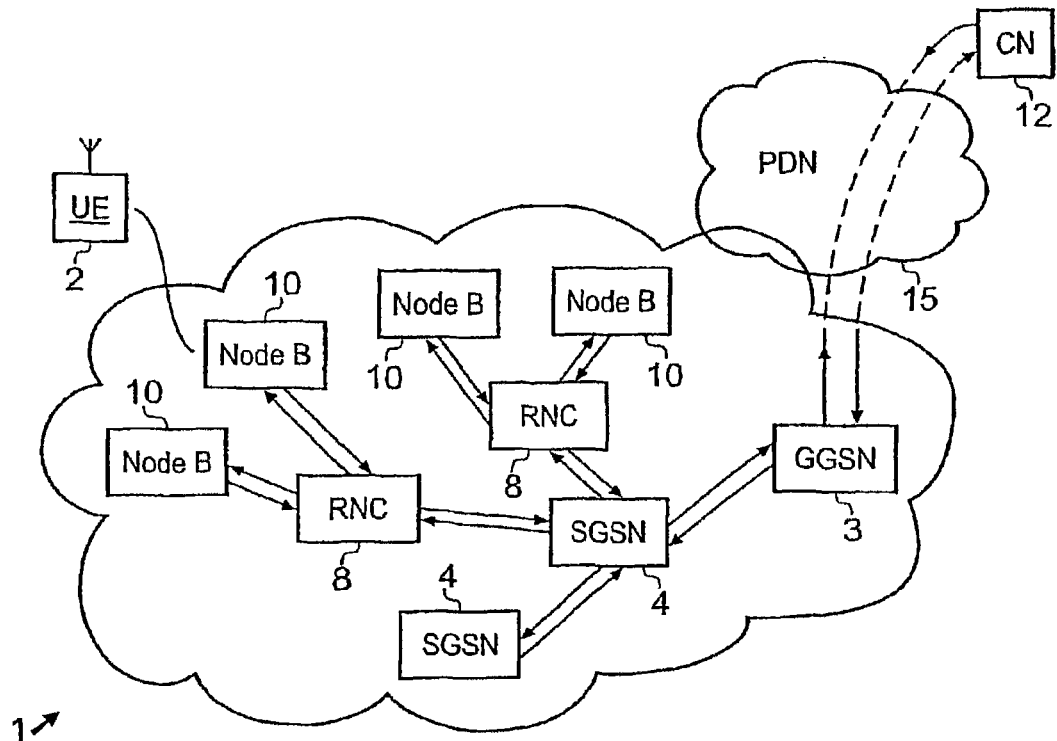
FIG. 1 is a schematic block diagram of a telecommunications system including a packet radio network which conforms to the GPRS/UMTS standard.
Figure 2:
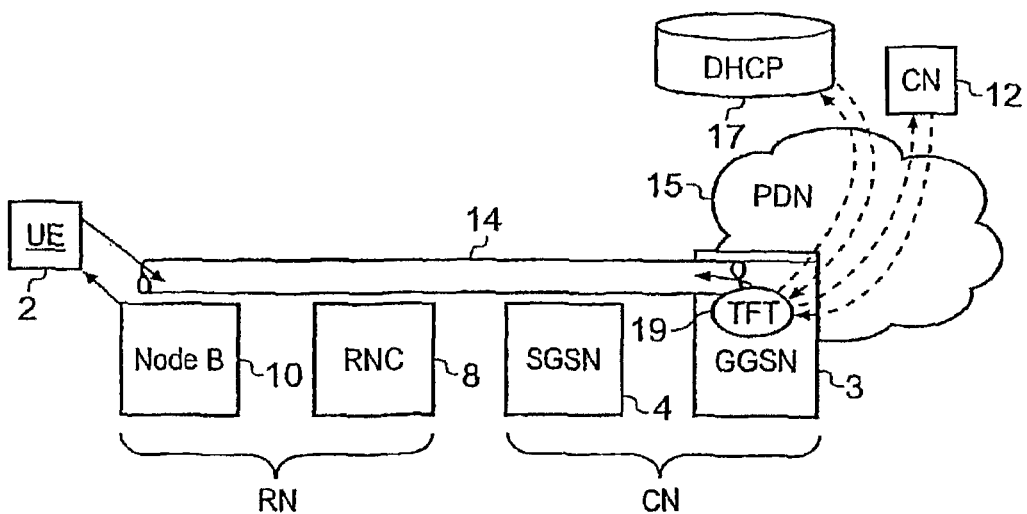
FIG. 2 is a schematic block diagram providing a simplified representation of the GPRS/UMTS network shown in FIG. 1, illustrating communication of internet packets via a packet communications bearer.

FIG. 1 provides a schematic block diagram of a GPRS/UMTS packet radio network 1 for communicating internet packets between a mobile user equipment (UE) 2 and a correspondent node (CN) 12, which is attached to an external packet data network 15. In FIG. 1 the UE 2 is arranged to host an application program providing, for example a multimedia service to a user. FIG. 1 shows elements of a GPRS network which are a GPRS gateway support node (GGSN) 3, a serving GPRS support node (SGSN) 4 and a radio network controller (RNC) 8. As shown FIG. 2, which provides a simplified representation of the GPRS network shown in FIG. 1, generally the GGSN 3 and the SGSN 4 form parts of a core network, CN, whereas the radio network controller RNC 8 forms part of a radio network RN. As shown in FIG. 2, in a simplified form for the present description, the GPRS network 1 is providing an internet protocol bearer 14 for which a packet data context has been established. As will be explained shortly, a packet data protocol context provides a protocol for ensuring that an appropriate bearer is established, providing a quality of service for which the UE 2 has subscribed and for enforcing an authorised use of the bearer. The bearer 14 is established for the user equipment UE 2 for conveying internet packets via the GPRS network to the correspondent node. The internet packets egress from the GPRS network 2 from the GGSN 3 to a packet data network 15 operating in accordance with the same internet protocol as that for which the internet protocol bearer has been established.

It will be appreciated that GPRS is one example of a packet radio network with which the present technique finds application. As such the GGSN may be referred to more generally herein as a gateway support node and the SGSN may be referred to more generally as a serving support node.

Common PDP Context

Figure 3:
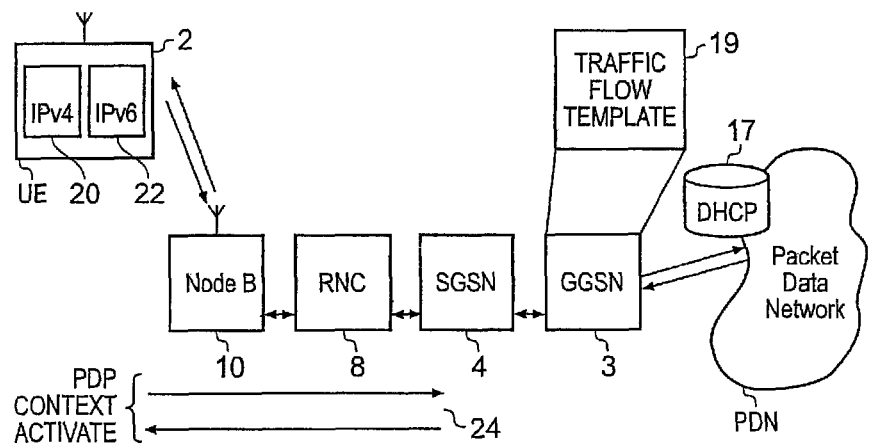
FIG. 3 is a schematic block diagram of the GRPS/UMTS network shown in FIG. 2 illustrating an arrangement in which a mobile user equipment sets up a common packet data protocol context.
Figure 4:
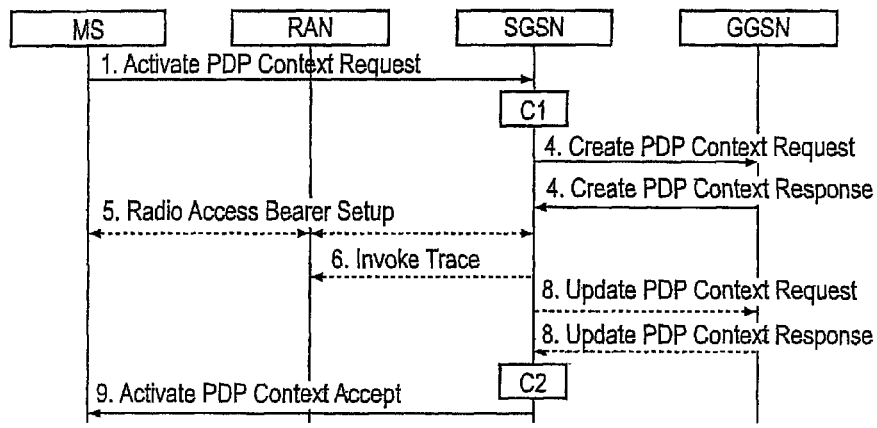
FIG. 4 is a message flow diagram illustrating a process of performing a packet data protocol activation request.

FIG. 3 presents an example of the present technique in which a mobile user equipment UE is arranged to establish a common PDP context. Parts also shown in FIG. 2 have corresponding reference numerals. As shown in FIG. 3 the UE has a dual protocol stack. That is the UE 2 contains an IPv4 internet protocol stack 20 and an IPv6 internet protocol stack 22. Thus, the UE 2 may wish to use one or both of an IPv4 address and an IPv6 address establishing a communication session in accordance with an IPv4 and an IPv6 respectively. To this end, the UE 2 sends a packet data protocol (PDP) context activation request as illustrated by arrows 24 to the SGSN 4. Those acquainted with the GPRS standard will know that the PDP context activation procedure establishes the appropriate control and routing for the activation of a bearer across the GPRS network in accordance with the packet data protocol. The PDP context activation procedure is illustrated in FIG. 4. The PDP context activation procedure will not be explained in detail because this is known from the 3GPP document TS 24.229. Following establishment of a GPRS bearer, the UE 2 then communicates information for establishing a Traffic Flow Template (TFT) 19 in the gateway support node (GGSN) (also shown in FIG. 2). As will be explained shortly the TFT is arranged to filter incoming packets in order to identify the appropriate PDP context, which has been established by the UE, so that the corresponding internet packet bearer across the GPRS network can be selected.

The known PDP context activation for establishing a GPRS/UMTS session as defined in existing GPRS/UMTS standard specifications, requires the following which can make each GPRS/UMTS session/PDP Context IP type specific:

1. The PDP Context Activation Request must indicate what type of PDP is to be set up: PPP type, IPv4 type, IPv6 type.
2. End User Address which contains a PDP Address (an IP address) will need to be empty to be allocated an internet protocol address, as the result of a successful set-up of PDP Context, if the UE chooses to use dynamic IP address allocation.

Both PDP Type and the PDP Address are encoded in End User Address Information Element (Ref: TS 29.060), which will be explained shortly.

Figure 5:
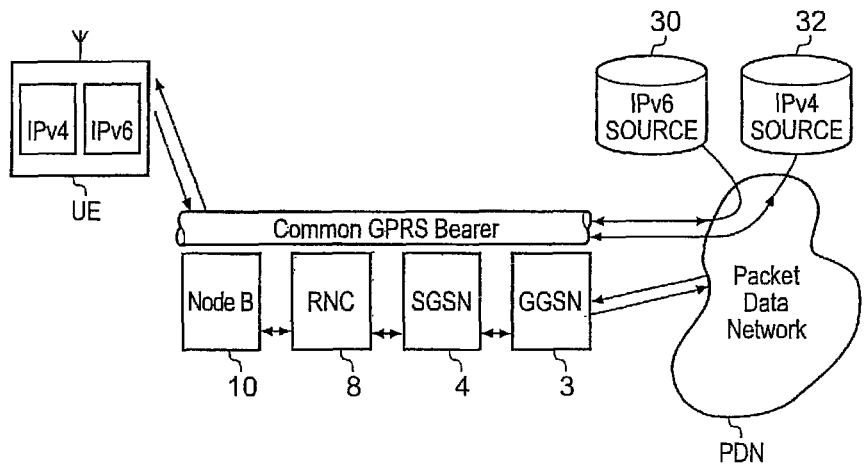
FIG. 5 is a schematic block diagram of the GRPS/UMTS network shown in FIG. 3 illustrating a further operation of the process of setting up a common packet data protocol context.

As shown in FIG. 5, in accordance with the present technique, a common PDP is established for communicating either IPv4 internet protocol packets or IPv6 packets or both IPv4 and IPv6 packets, or any other internet protocol version packets to and from the UE 2. As such the UE 2 may receive internet packets from an IPv6 source 30 or an IPv4 source 32 via a packet data network PDN.

Figure 7:
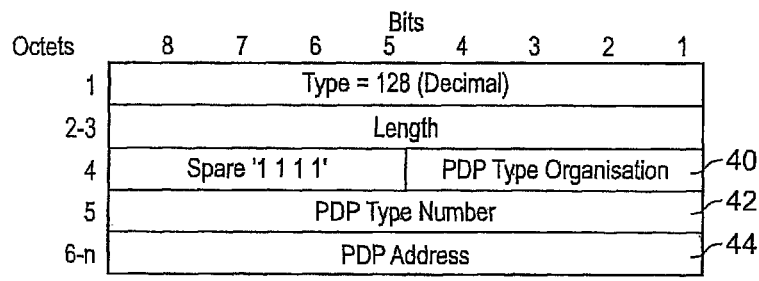
FIG. 7 provides a table of values which can be used to fill a PDP type organisation field in the end user information element of FIG. 6.

As explained above the PDP context is established for either an IPv4 address or an IPv6 address or a point to point protocol (PPP) address type. To establish either an IPv4 or an IPv6 bearer the mobile user equipment UE communicates as part of the PDP context an end user address information element comprising fields of a predetermined number of bytes identifying particular parameters. An example of a generic form of the end user address information element is shown in FIG. 6. As shown in FIG. 6 one of the fields 40 provides a packet data protocol (PDP) type organisation, a further field specifies the PDP type number 42, and a further field 44 specifies the PDP address. According to the present 3GPP standard the PDP type organisation values and PDP type number which are provided within the data fields 40, 42 of the information element shown in FIG. 6, are shown in FIG. 7, although a further explanation will not be given here because this is part of the known standard.

If the UE 2 is to activate a PDP context of an IPv4 bearer then the end user address information element of FIG. 6, is adapted to a form shown in FIG. 8. In contrast, if the UE 2 is to activate a PDP context for an IPv6 bearer then the end user address information element information of FIG. 6 is adapted to a form shown in FIG. 9 is used. As can be seen in FIGS. 8 and 9 the PDP organisation type field 40 is set to 1, in accordance with the table shown in FIG. 7. For the IPv4 PDP context, the information element of the PDP type number field 42 is set to hexadecimal (21). For the IPv6 PDP context the end user address information element shown in FIG. 9 also provides a PDP type organisation equal to 1, but the PDP type number field 42 specifies hex (57) to indicate that the bearer should be an IPv6 bearer.

There are now two alternatives for specifying an IPv6 and IPv4 PDP context. If the UE 2 wishes to use its own IPv4 or IPv6 addresses then the end user address information element includes in the IP address field 44 either the IPv4 address or the IPv6 which is filled by UE with a specified IPv4 or IPv6 address. In contrast, as shown in FIGS. 2 and 3, the internet protocol address which the UE is to use may be requested as part of the PDP context activation and in this case the address is provided by a DHCP server. Therefore, in the case where the UE is requesting an IP address. The address field 44 is left empty (set to zero bytes) for each of the address fields 44 shown in FIGS. 8 and 9.

According to the present technique as illustrated in FIGS. 3 and 5 the mobile user equipment UE may establish a common PDP context. A common PDP context establishes a bearer, in accordance with a packet data protocol, for communicating internet packets across a GPRS network. As part of the packet data protocol, policy enforcement, quality of service and routing are established in order to arrange for the internet packets to be communicated via the established bearer. However, the common PDP context establishes a bearer which is not specific to any internet protocol version and furthermore may be shared between more than one communication session. Furthermore, the communication sessions may be from different mobile user equipment. Alternatively, a common PDP context may be established for more than one communication session although the communication session may use separate internet protocol bearers. Therefore a common PDP Context is defined to be a PDP Context that is common to PPP data frames, IPv4 and IPv6 packets, in fact to any other data protocols. A GPRS/UMTS session with a common PDP context can be used for transmitting and receiving PPP frames, IPv4 and IPv6 packets as well as any other format of data packets in compliance with a data transport protocol.

The procedure for setting up a GPRS/UMTS session with Common PDP Context is similar to that for a conventional PDP context mentioned above, except that the PDP Type is NULL. The PDP Type Number is set to be NULL so as to be maximum interoperable with existing GPRS/UMTS session management processes. In case of UE requesting for a dynamic IP address (either IPv4 or IPv6), the PDP Address in the end user address is left empty as it is defined in existing GPRS/UMTS session set-up process. In fact, this IP address specific element will enable the UE's to generate and receive either IPv4 or IPv6 packets while they share the same common PDP context.

According to the present technique the common PDP context is established for a non specific internet protocol version using an end user address information element which includes a PDP type number set to a predetermined value identifying that the gateway support node should establish a common PDP context. Once a PDP context has been established, then if the gateway support node receives a further request for a common PDP context, then the communication session for which that PDP context is initiated will be arranged to join the common PDP context. However, although the common PDP context is not specific to a particular internet protocol version, the UE 2 still specifies the address which is to be used in accordance with the internet protocol version for which the communications session is established. Thus, the UE establishes the common PDP context with for example an IPv4 address or an IPv6 address. In accordance with the present technique an end address information element for an IPv6 common PDP context identifies that the PDP type is common by identifying in the PDP type number field 42 predetermined characters for example which are set to "NULL". The PDP address field 44 is then either filled with an IPv6 address if the UE is specifying the IPv6 address which it wishes to use, or bytes 6 to 21 of the information element are set to "zero" (see FIG. 10). As such the gateway support node knows that the common PDP context is to be established for an IPv6 address using the address specified or if the PDP address field is set to zero requests an IPv6 address from the DHCP server 17.

Correspondingly, if the UE 2 is establishing the common PDP context for an IPv4 address, then as shown in FIG. 11, with the PDP type number field 42 set to "NULL", the IPv4 address is set to the lower four bytes of the PDP address field 44. The remaining twelve bytes are set to "1". Alternatively, if the mobile user equipment wishes to request an IPv6 address from the gateway support node 3 then the lower four bytes are set to a predetermined value for example "0" with the remaining twelve bytes set to "one". Accordingly, the gateway support node 3 then fetches an IPv4 address from the DHCP server 17 and fills the lower four bytes with the IPv4 address.

As indicated above with reference to FIGS. 2 and 3, once the common PDP context has been established, then a Traffic Flow Template (TFT) is set by the UE 2 in the GGSN 3. To this end, as part of the PDP context activation process a traffic flow template information element is communicated to the GGSN by the UE. FIG. 12 provides a representation of each of the fields of the traffic flow template information element in accordance with a known 3GPP standard. As illustrated in FIG. 12 one of the fields 50 of the information element provides a packet filter list and another of the fields 52 provides a parameter list. The packet filter field 50 specifies a packet filter component type identifier upon which internet packets are to be filtered Annex 1 provides a specification of the packet component type identifiers. These include either an IPv4 source address type or an IPv6 source address type or various other parameters. Thus once a component type is specified in the packet filter list field 50 a parameter on which that type is to be filtered is specified in the parameter list field 52.

Traffic Flow Template for Common PDP Context

According to the present technique once a UE has established a common PDP context then a packet filter type identifier is specified for filtering IP packets to identify the common PDP context. Thus the mobile user equipment establishes a TFT for the common PDP context. To this end, a further packet filter component type identifier is established with for example a bit pattern "00110001". Thus once the common PDP context has been established for a UE, a TFT is set up for that UE specifying a packet filter component for a common PDP address type. The parameter for filtering the common PDP address type will then be either the IPv4 address or the IPv6 address which the mobile user equipment has specified for using the common PDP context.

The packet filter components in the TFT for Common PDP Context are non IP type specific. In order to maximise interoperability with existing operational requirements and procedures of TFT based operators (such as secondary PDP Context selection/QoS differentiation), two new fields are defined to be incorporated into a TFT information element in accordance with the present technique which are a common PDP Address Type and a common PDP Address. The modified TFT information element for common PDP Context with a common PDP Address Type field as one of its packet filter component is defined as:

| 8 7 6 5 4 3 2 1 | |
|---|---|
| 0 0 1 1 0 0 0 1 | Common PDP address type |
| 0 0 0 1 0 0 0 0 | IPv4 source address type |
| 0 0 1 0 0 0 0 0 | IPv6 source address type |
| 0 0 1 1 0 0 0 0 | Protocol identifier/Next header type |
| 0 1 0 0 0 0 0 0 | Single destination port type |
| 0 1 0 0 0 0 0 1 | Destination port range type |
| 0 1 0 1 0 0 0 0 | Single source port type |
| 0 1 0 1 0 0 0 1 | Source port range type |
| 0 1 1 0 0 0 0 0 | Security parameter index type |
| 0 1 1 1 0 0 0 0 | Type of service/Traffic class type |
| 1 0 0 0 0 0 0 0 | Flow label type |

When the UE creates a TFT for using a Common PDP Context, it sets the Common PDP Address type to be "0 0 1 1 0 0 0 1" and the Packet Filter component for the Common PDP Address itself is 16 bytes long. The Common PDP Address Type no longer uses Source Address Type because the packet filter based on destination address may be necessary to distinguish Common PDP Context from Primary/Secondary PDP Context. For UEs that send and receive IPv4 packets, the packet filter component for the PDP Address occupies the lower 4 bytes of the 16 bytes long PDP Address packet filter component, and the higher 12 bytes are filled with value of "0". For UE that send and receive IPv6 packets, the packet filter component for the PDP Address occupies the whole 16-byte long packet filter component. For the situation in which more then one UE is sharing the Common PDP Context, there is correspondingly more than one TFT associated with the Common PDP Context, each TFT is used to match an incoming packet to the Common PDP Context, which is necessary when there are co-existing Common PDP Context, Primary PDP Context and Secondary PDP Context (see below).

Selecting Common PDP Context from Other PDP Contexts

As indicated above, several UEs may have different types of PDP Contexts active at the same time, which are all managed and terminated at the GGSN. The different PDP Contexts can be Common PDP Context, Primary IPv4 or IPv6 PDP Context and Secondary IPv4 or IPv6 PDP Contexts (the latter two are the 3GPP standard defined). A packet arriving at the GGSN will need to be delivered across the appropriate PDP Context due to specific requirements such as Quality of Service, charging, security, etc. The 3GPP standard defined TFT is used to distinguish and select the Primary and Secondary PDP Contexts (either IPv4 or IPv6) by using a combination of packet filters. For Common PDP Contexts, which may be shared by UE's that send and received both IPv4 and IPv6 packets, there are two alternatives for distinguishing between Common PDP Contexts from existing standard defined Primary/Secondary PDP Contexts, which are explained in the following paragraphs.

In the first alternative a combination of TFTs can be used. Each of the UE that uses the Common PDP Context can generate its own TFT as explained above. A packet arriving at the GGSN will follow the similar procedure as the standard TFT operations, which is to use the PDP Address packet filter. The difference is that the TFT for using/sharing Common PDP Context has the PDP Address Type code to be "0 0 1 1 0 0 0 1" as explained above. When there is one Common PDP Context only (on Primary or Secondary PDP Contexts), an internet protocol packet arriving at the GGSN will use the Common PDP Context as the default to reach the UE by selecting the appropriate bearer. When there are co-existing Common PDP Context and Primary PDP Contexts, and if the Primary PDP context does not have TFT, an incoming IP packet would be first matched to the TFT's associated with the Common PDP Context. If no match is found the Primary PDP Context is used without TFT.

When a Common PDP Context co-exists with a primary PDP context as well as a secondary PDP Context, each of which has an associated TFT (particularly useful when different Quality of Services are required for each PDP Context), an incoming internet protocol packet can be matched to either the Common PDP Context or the Primary or Secondary PDP Context using the TFT based packet filtering. This is because the packet header information is insufficient to distinguish which PDP context to use due to overlapping packet filter parameters between the TFTs associated with the Common PDP context and those for Primary/Secondary PDP Contexts. As such a second alternative may be used.

In addition to the use of different PDP Address Types for distinguishing TFT used for Common PDP Contexts from Primary/Secondary PDP Contexts, extra information is needed for deciding which PDP Context to use to deliver an incoming packet when there are co-existing Common, Primary and Secondary PDP Contexts. According to the second alternative, the internet protocol packet destination address (either IPv4 or IPv6) is added as one of the packet filter components used for the Common PDP Context. As a result, when a UE activates or joins a Common PDP Context, it creates a TFT with a PDP Address Type of "0 0 1 1 0 0 0 1" and a packet filter component using its own IP address (either IPv4 or IPv6).

When an incoming packet arrives at the GGSN, the TFT-based operational procedure is as follows:
1. Check each TFT corresponding to the PDP source Address Types (00010000 for IPv4, 00100000 for IPv6) to see if any matching PDP context is available. If yes, use the matching PDP Context (either the Primary or Secondary) to deliver the packet.
2. If no matching TFT is found in 1), then check the TFT of the Common PDP Address Type (00110001) to see if the destination address of an incoming packet matches one of the packet filter components in the TFT. If yes, use the Common PDP Context to deliver the packet.
3. If no matching TFT is found in 1 or 2, check if there is a PDP Context without TFT. If yes, use the PDP context to deliver the packet; otherwise, discard the packet.

Establishing/Joining a Common PDP Context

Since a Common PDP Context can be shared by more than one UE, a UE activating a Common PDP Context will simply need to join an existing Common PDP Context if it has already been established (either statically or dynamically set up).

Modifying a GPRS/UMTS Session with Common PDP Context

The same processes as defined in existing GPRS/UMTS standard specifications (TS 23.060) can be used to modify a communications session. However, instead of modifying the existing Common PDP context which are being used by other UE's, the UE will need to leave the Common PDP Context first and may choose to initiate or join in a different Common PDP Context.

Leaving or Deleting a Common PDP Context

The same process as defined in existing GPRS/UMTS standard specifications for Deleting PDP Context can be used with the common PDP context. However, if the Common PDP Context is still being used by other UE's, the Common PDP Context is not released. The UE that wishes to delete the Common PDP Context will leave the Common PDP Context by having its TFT's deleted and the associated GTP_C/GTP_U Tunnels released.

Example Illustration of Co-Existence of Different PDP Contexts

FIG. 13 provides an example illustration of an arrangement in which a plurality of UEs have established PDP contexts. Two of UEs have established a common PDP context. As shown in FIG. 13, three UEs UEa, UEb, UEc are communicating internet protocol packets across the GPRS network. Two of the mobile user equipment UEa, UEb have established a common GPRS bearer 90. For example the first mobile user equipment UEa may establish the common GPRS bearer by performing a PDP context activation request specifying that the PDP context should be a common PDP context as described above. The GGSN 3 then establishes a common PDP context 100 for the first UE UEa. The first UE UEa then establishes in combination with the GGSN 3 a traffic flow template TFTa which includes in the parameter list a common PDP address type. For the example shown in FIG. 13 the first mobile user equipment UEa specifies that the internet protocol address which it will use for its communication session is an IPv4 address. Thus the common PDP address type specified by the TFTa is an IPv4 address as illustrated for the TFTa 102 for the parameter list 104.

The second UE UEb also sets up a common PDP context with the GGSN 3. Since the common PDP context 100 has already been established by the first UE UEa, then the GGSN 3 is arranged to join the second UE UEb to the common PDP context. However, a separate common PDP context 100 is associated with a TFT for the second UE which is a TFTb. TFTb also specifies that the packet filter component is a common PDP address type and for the second UE an IPv6 address is specified as the filter component in a field 108. Thus, each mobile user equipment UEa, UEb, UEc, establishes its own TFT. In contrast, the third UE UEc requests a conventional primary PDP context activation for its own dedicated GPRS bearer 112. The third mobile user equipment UEc may establish a secondary PDP context 112 which is also arranged to communicate IP packets via a GPRS bearer although only one 112 is shown in FIG. 13. For the third UE UEc a TFTc 114 is established in order to filter packets to either the primary or the secondary PDP context in accordance with a conventional arrangement. Thus as illustrated in FIG. 13 two of the mobile user equipment UEa, UEb are communicating via a common GPRS bearer 90 using a common PDP context 100 although each has its own traffic flow template TFTa, TFTb. In an alternative arrangement the first and second UEs UEa, UEb may establish separate GPRS bearers 90, 114 and to communicate internet packets via these separate bearers even though they share a common PDP context.

Common GPRS Bearer

There are two possible scenarios for the first and second mobile user equipment UEa, UEb of the example represented in FIG. 13 to communicate via the GPRS network 1 using the shared common PDP context. One example is shown in FIG. 14. In FIG. 14 the GGSN 3 establishes a separate GPRS Tunnelling Protocol (GTP) bearer GTP_UA, GTP_UB for each of the first and second UEs UEa, UEb. As shown in FIG. 14 although the first and second UEs share a common PDP context, the internet protocol packets are communicated across the GPRS network via separate GTP bearers. When the internet protocol packets reach the RNC 8 for communication via a Radio Access Bearer (RAB) the separate GTP GTP_UA, GTP_UB are mapped onto corresponding radio access bearers RABa, RABb. Accordingly, each of the radio access bearers and the GTP established for each of the first and second UEs UEa, UEb can specify a different quality of service QoSa, QoSb. Thus, there is a one to one mapping between the radio access bearer and the GTP. FIG. 14 is therefore an example of a common PDP context but using different GPRS bearers.

An alternative arrangement is shown in FIG. 15 in which the first and second UEs UEa, UEb which have established a common PDP context utilise a common GPRS bearer. As such there is no distinction of the GTP established by the GGSN 3. That is to say the GPRS bearer is shared between the first and second UEs UEa, UEb. In order to correctly communicate internet packets across the GPRS network via the radio access interface established by the RNC, the RNC must identify internet protocol packets, which are destined for either the first UE UEa or the second UE UEb. To this end, the RNC is provided with a radio access bearer filter 200. The radio access bearer filter 200 receives the internet packets from the GTP_U and identifies an appropriate one of two radio access bearers RABa, RABb from which and to which the first and second UEs UEa, UEb communicate internet packets respectively. In order to filter the internet packets correctly onto the appropriate radio access bearers RABa, RABb, the RAB filter 200 is provided with a destination address of the first and second UEs UEa, UEb. Thus, as illustrated in FIG. 15, the RAB filter 200 identifies the destination address in the header of the internet protocol packet 202 received in the GTP units 204. In accordance with the destination address for the first or the second UEs UEa, UEb, the RAB filter filters the internet protocol packets to the appropriate bearer for delivery to the corresponding UE UEa, UEb.

Providing Different Quality of Service on a Common GPRS Bearer

Figure 16:
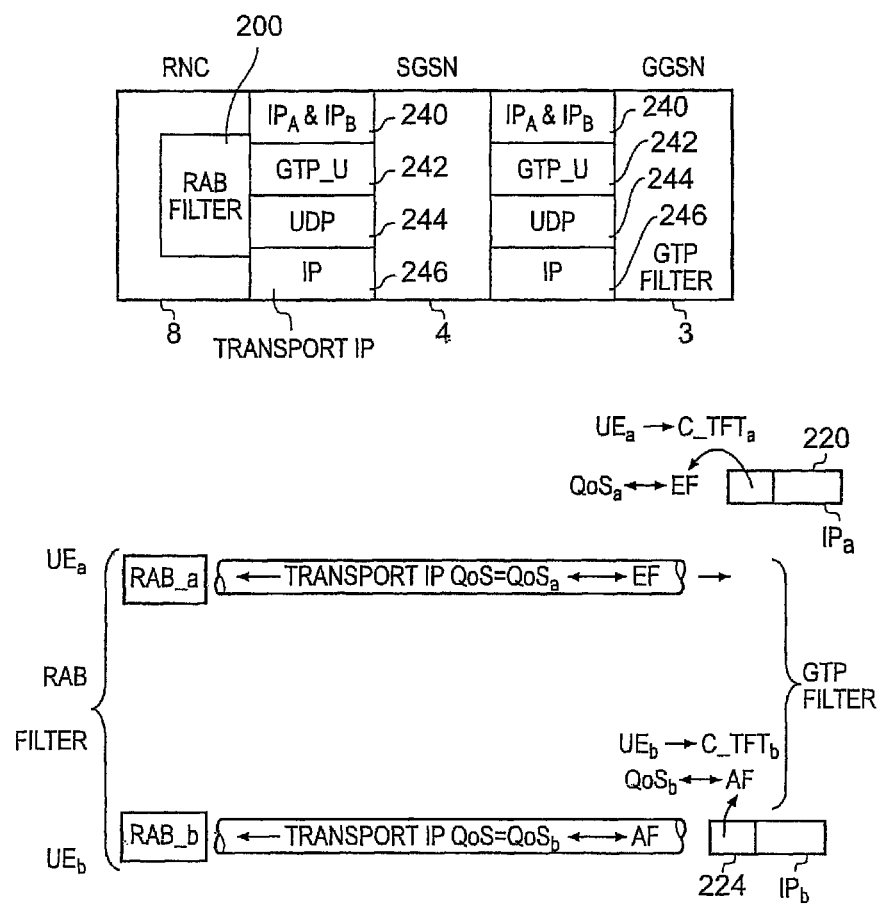
FIG. 16 is a schematic representation of parts of the GPRS/UMTS network of FIG. 15, illustrating the operation of the radio network controller to communicate internet packets to the two mobile user equipment which share a common packet data protocol context and a common packet data protocol bearer, using a radio access bearer filter.

FIG. 16 provides an illustrative representation of an arrangement by which different quality of service can be provided to the communication of internet packets via a common GPRS bearer. For example, one communications session may be communicating internet packets in accordance with Web browse, whereas another communications session may be communicating internet packets in accordance with voice over internet protocol. In accordance with the present technique differing quality of services are achieved by mapping a differential service quality of service (QoS) class provided within the IETF internet protocol standard onto an appropriate quality of service for communication across the GPRS core network. As those acquainted with the internet protocol standards v6 and v4 will appreciate, the differential service QoS provided within the IETF standard has three categories which are Expedited Forwarding (EF) Assured Forwarding (AF) and Best Effort (BE). As shown in FIG. 16 internet packets IPa, IPb which are being communicated to either the first or the second UEs UEa, UEb 220, 224 are received at the GGSN 3. In each of the respective headers of the internet packets IPa, IPb, 220, 224 is provided a differential service QOS. For the example shown in FIG. 16 the differential service QoS for the first internet packet destined for the first UE IPa 220 is EF whereas the differential service QOS for the second internet packet destined for the second UE IPb 224 is AF. The GGSN 3 is arranged to form a GTP filter which is operable to map the differential service QoSs EF and AF into an appropriate quality of service QoSa, QoSb for communication across the core network to the RNC. The quality of service provided by the GTP_U QoSa, QoSb may be the same as the EF and AF according to the IETF standards, or maybe an alternative differential in quality of service class. The first and second internet packets IPa, IPb 220, 224 are then communicated via the transport IP layer to the RNC.

As shown in FIG. 16 communication between each of the core network elements GGSN, SGSN 3, 4 to the RNC 8, is via different protocol levels. These are a higher level end to end internet protocol level 240, a GTP_U internet protocol level 242, a UDP layer 244 and an internet protocol transport layer 246. Thus, the GGSN 3 is arranged to communicate the internet packets via the transport internet protocol layer using quality of service QoSa, QOSb identified from the differential quality of service AF, EF identified in the headers of each of the packets for communication to the respective first and second UEs UEa, UEb.

When the internet packets are received at the RNC, then the RAB filter 200 operates in a corresponding way to that explained with reference to FIG. 15 to pass the packets from each of the internet protocol transport layers to the appropriate radio access bearer RABa, RABb. The appropriate radio access bearers are identified by the destination address of the first or second user equipment UEa, UEb. In accordance with the present technique the UEs are arranged to establish a RAB filter, when the common PDP context is established. Therefore in an analagous way in which the TFT is established, each UE sets up an appropriate component in the RAB filter, so that the internet packets received from the transport IP layer can be filtered to the appropriate radio access bearer.

Supporting Authorisation of Multiplexing IMS Sessions

Figure 17:
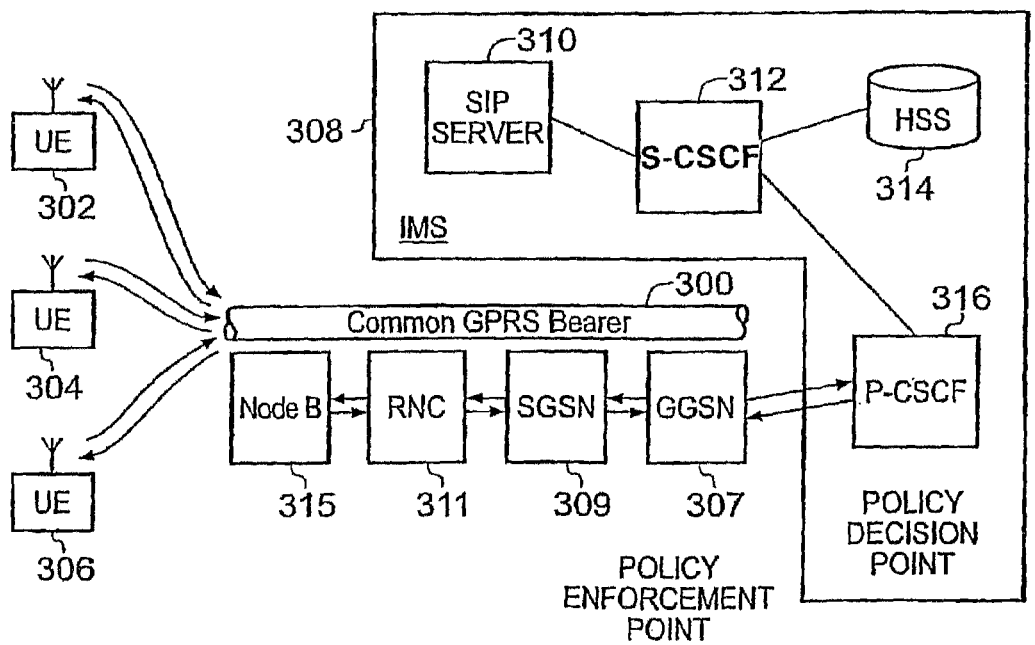
FIG. 17 is a schematic block diagram of parts of a GPRS/UMTS network corresponding to the representation shown in FIGS. 3 and 5, with an internet protocol multi-media subsystem (IMS), via which three mobile user equipment are sharing an IMS session.

FIG. 17 provides an example illustration of a common GPRS bearer 300 being used by three UEs 302, 304, 306 for a communications session via a GPRS network, which includes, as explained above, a GGSN 307, and SGSN 309, an RNC 311 and a Node B 315. In FIG. 17 the UEs 302, 304, 306 wish to share a common multimedia communications session provided by an internet protocol multimedia subsystem 308. The internet protocol multimedia subsystem (IMS) comprises a Session Initiation Protocol (SIP) server 310, a Serving-Call State Control Function (S-CSCF) 312 and a Home Subscriber Server (HSS) 314. The IMS also includes a proxy call state control function (P-CSCF) 316.

A mobile user equipment may open an IMS session by sending a SIP message to a SIP server 310. This is established by sending a SIP: INVITE message to the P-CSCF 316. The P-CSCF 316 forms a policy decision point for the IMS and so analyses the request with respect to subscription information held within the HSS. If the request is approved, then the P-CSCF 316 issues an authorisation token, to authorise the UE to use an appropriate bearer for the IMS communications session. The token is generated in accordance with the 3GPP technical specifications TS23.228, TS23.207.

Figure 18:
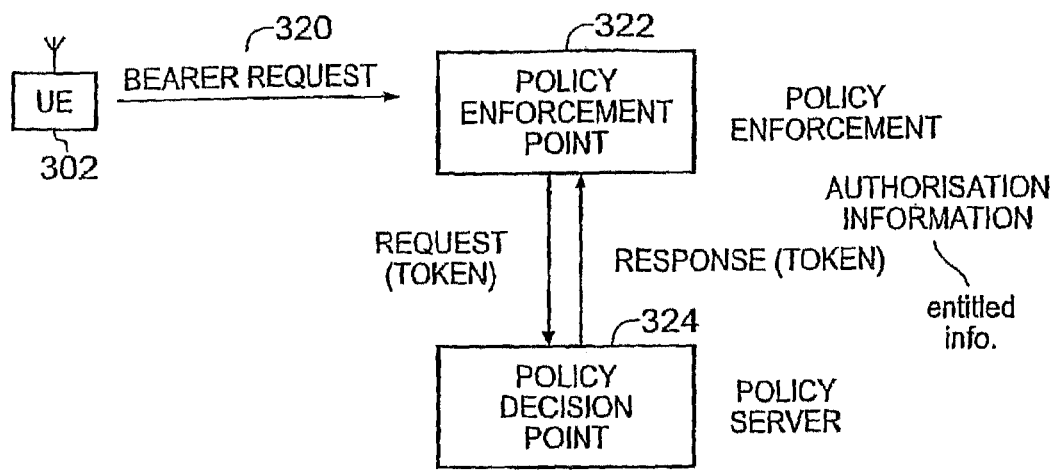
FIG. 18 is a schematic block diagram of a general representation of elements which are used to perform session set-up with media authorisation for communicating using an IMS.

FIG. 18 corresponds to the IMS authorisation procedure, which is established in the above-mentioned 3GPP technical specifications. FIG. 18 provides a general representation of a process of generating an authorisation token on request from a UE and subsequent enforcement of a communications session in accordance with an issued authorisation token. As shown in FIG. 18 one of the UEs 302 requests authorisation for an IMS session. The UE 302 sends a request for a bearer to a policy enforcement point 322. The policy enforcement point 322 forwards the token requesting a bearer to the policy decision point, which is a policy server 324. The policy server 324 then determines whether the mobile user equipment 302 is entitled to open an IMS communication session using the appropriate bearer on the GPRS network. The policy decision point 324 then generates an authorisation token, if it accepts the request, representing an authorisation for the communications session and communicates the token to the policy enforcement point 322. The policy enforcement point then informs the UE that an appropriate IMS bearer can be provided for the UE. Thus when the mobile user equipment requests an appropriate bearer from the policy enforcement point, using the token the bearer is authorised and provided to the mobile user equipment 302.

In FIG. 17 the GGSN 307 acts as the policy enforcement point for providing authorisation and establishing an appropriate bearer for supporting an IMS session. However, in FIG. 17 the mobile user equipment 302, 304, 306 wish to establish an IMS session across a common GPRS bearer.

In known IMS session token authorisation procedures, there is no provision for UEs to request authorisation for a communications session which shares a common GPRS bearer, and to receive in a single token, authorisation for communications sessions which are multiplexed over a shared GPRS bearer. To this end, a hierarchical authorisation mechanism is proposed, in which a hierarchical authorisation token is generated by policy servers acting as policy decision points. An example of a hierarchical authorisation token is shown in FIG. 19. The hierarchical authorisation token shown in FIG. 19 provides, in a single token, authorisation for either a group IMS communications session or a single IMS communications session. As shown in FIG. 19, the authorisation token generated by a policy server 316, 324 in accordance with the present technique includes an authorisation type field 400, a group IMS session authorisation identifier 402, and a single IMS session authorisation identifier field 404. The authorisation type field 400 is provided with a predetermined value, which identifies whether the IMS communication session is to use a dedicated resource/GPRS bearer or whether the IMS communication session is to use a GPRS bearer shared with other IMS communications sessions and UEs. Example values for the authorisation type field is provided as follow:

01: Group IMS session authorisation identifier
   10: Single IMS session authorisation identifier If the IMS communications session is to use a dedicated resource/GPRS bearer, then the group IMS session authorisation identifier field 402 is set to be "0" and the single IMS session authorisation identifier field 404 is provided with a unique authorisation token for the IMS session. If the communications session is to share a GPRS bearer with other IMS communications sessions, then the group IMS session authorisation identifier field 402 is provided with a unique authorisation value to define that session, and the single IMS session authorisation identifier field 404 is set to be "0". As mentioned above, the authorisation token is generated by the policy server on request from a UE, such as for example, following a SIP: INVITE message. In response, the P-CSCF 316, which acts as the policy decision point communicates with the S-CSCF 312 in the IMS network. The S-CSCF then retrieves subscription data from the HSS 314 to establish whether the authorisation can be provided to establish the common GPRS bearer. If authorised, then the appropriate authorisation token is issued to the UEs 302, 304, 306.

In accordance with the PDP context activation procedure establishing a communications session, each of the UEs 302, 304, 306 sends a hierarchical authorisation token providing the authorisation identifier to the GGSN 307. The GGSN then checks the authorisation type, to determine whether the communications session is a group session or a single session.

If the value in the authorisation type field 400 indicates that the session authorised is a group IMS communications session on a shared GPRS bearer, the GGSN 307 establishes a common GPRS bearer. The GGSN 307, then analyses the group IMS session authorisation identifier to query the P-CSCF 316 (acting as Policy enforcement point) to confirm the authorisation for the IMS communications session request with the IMS.

If the value in the authorisation type field 400 indicates that the session authorised is a single IMS communications session, the GGSN 307 establishes a dedicated GPRS bearer. The GGSN 307, then analyses the single IMS session authorisation identifier to query the P-CSCF 316 (acting as Policy enforcement point) to confirm the authorisation for the IMS communications session request with the IMS.

As alternative example, a hierarchical authorisation token could be generated with a structure as shown in FIG. 20. In FIG. 20, the hierarchical authorisation token includes an authorisation type field 400, which corresponds to that for the example authorisation token shown in FIG. 19. However only a single field is provided to represent the IMS session authorisation identifiers which must be shared with both group authorisation identifiers and single authorisation identifiers. Thus although the example shown in FIG. 20 is simpler, the address range must be partitioned to identify correctly either group session identifiers or single session identifiers.

Figure 21:
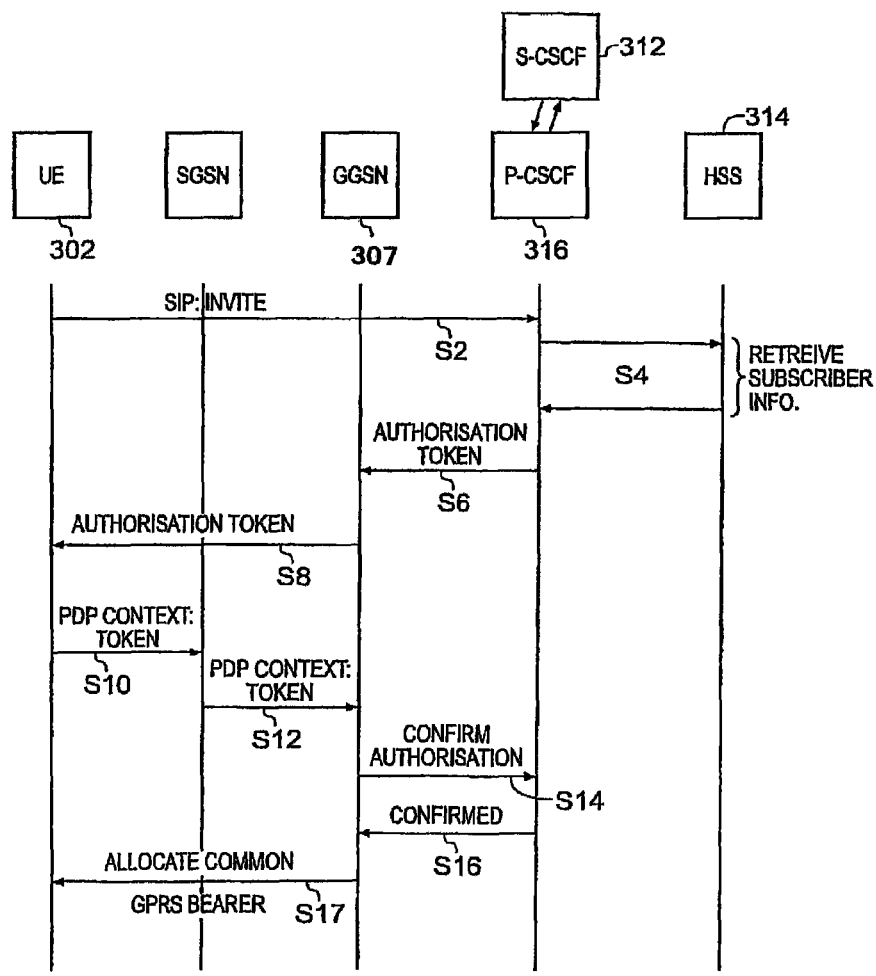
FIG. 21 is a message flow diagram illustrating a process through which a plurality of mobiles perform a session set-up and authorisation for a group communications session sharing a common GPRS bearer.

A message flow illustrating the generation and communication of the authorisation token on request from the mobile user equipment is provided in FIG. 21 which is summarised as follows:

S1: A SIP: INVITE message is communicated from the mobile user equipment 302 to the P-CSCF 316.

S4: The P-CSCF 316 in combination with the S-CSCF 312 then retrieves subscriber information data from the HSS 314. In accordance with the subscriber information the P-CSCF 316 then determines whether the user is authorised to receive a shared IMS communications session and whether this can be provided via a common GPRS bearer. If accepted then an authorisation token is generated by the P-CSCF providing the type of authorisation (group or single) and the session authorisation identifier for the shared or dedicated bearer, which is passed to the GGSN.

S8: The GGSN then passes the authorisation token to the mobile user equipment 302.

S10: The mobile user equipment 302 then sets up a PDP context activation request providing the authorisation token as part of the protocol configuration option field.

S12: The SGSN receives the PDP context activation request and passes the authorisation token to the GGSN 307. The GGSN then confirms that the mobile user equipment has authorisation to establish a common communication session with other mobile user equipment, by confirming the session authorisation identifier with the P-CSCF.

S16: The P-CSCF 316 then confirms that the mobile user equipment is authorised to receive a common GPRS bearer for the IMS session.

S17: GGSN 307 then establishes the GPRS bearer and informs the mobile user equipment 302 that it has been allocated the common GPRS bearer.

Various further aspects and features of the present invention are defined in the appended claims.

Embodiments of the invention herein before described are provided as example only and various modifications may be made to those embodiments without departing from the scope of the present invention. For example, it will be appreciated that GPRS/UMTS is provided as one illustrative architecture with which the present invention finds application.

Annex 1

The packet filter contents field is of variable size and contains a variable number (at least one) of packet filter components. Each packet filter component shall be encoded as a sequence of a one octet packet filter component type identifier and a fixed length packet filter component value field. The packet filter component type identifier shall be transmitted first. In each packet filter, there shall not be more than one occurrence of each packet filter component type. Among the "IPv4 source address type" and "IPv6 source address type" packet filter components, only one shall be present in one packet filter. Among the "single destination port type" and "destination port range type" packet filter components, only one shall be present in one packet filter. Among the "single source port type" and "source port range type" packet filter components, only one shall be present in one packet filter.

Packet filter component type identifier
Bits

| 8 7 6 5 4 3 2 1 | |
|---|---|
| 0 0 0 1 0 0 0 0 | IPv4 source address type |
| 0 0 1 0 0 0 0 0 | IPv6 source address type |
| 0 0 1 1 0 0 0 0 | Protocol identifier/Next header type |
| 0 1 0 0 0 0 0 0 | Single destination port type |
| 0 1 0 0 0 0 0 1 | Destination port range type |
| 0 1 0 1 0 0 0 0 | Single source port type |
| 0 1 0 1 0 0 0 1 | Source port range type |
| 0 1 1 0 0 0 0 0 | Security parameter index type |
| 0 1 1 1 0 0 0 0 | Type of service/Traffic class type |
| 1 0 0 0 0 0 0 0 | Flow label type |

All other values are reserved. For "IPv4 source address type", the packet filter component value field shall be encoded as a sequence of a four octet IPv4 address field and a four octet IPv4 address mask field. The IPv4 address field shall be transmitted first.

For "IPv6 source address type", the packet filter component value field shall be encoded as a sequence of a sixteen octet IPv6 address field and a sixteen octet IPv6 address mask field. The IPv6 address field shall be transmitted first.

For "Protocol identifier/Next header type", the packet filter component value field shall be encoded as one octet which specifies the IPv4 protocol identifier or IPv6 next header.

For "Single destination port type" and "Single source port type", the packet filter component value field shall be encoded as two octet which specifies a port number.

For "Destination port range type" and "Source port range type", the packet filter component value field shall be encoded as a sequence of a two octet port range low limit field and a two octet port range high limit field. The port range low limit field shall be transmitted first.

For "Security parameter index", the packet filter component value field shall be encoded as four octet which specifies the IPSec security parameter index.

For "Type of service/Traffic class type", the packet filter component value field shall be encoded as a sequence of a one octet Type-of-Service/Traffic Class field and a one octet Type-of-Service/Traffic Class mask field. The Type-of-Service/Traffic Class field shall be transmitted first. For "Flow label type", the packet filter component value field shall be encoded as three octet which specifies the IPv6 flow label. The bits 8 through 5 of the first octet shall be spare whereas the remaining 20 bits shall contain the IPv6 flow label.

The invention claimed is:

1. A mobile user equipment for providing a facility for communicating internet packets to and/or from a packet radio network, the mobile user equipment comprising an application program providing a service to a user, the packet radio network comprising a gateway support node operable to provide a packet data protocol context for controlling the communication of the internet packets to and/or from the packet radio network from and/or to the mobile user equipment via a packet communications bearer, a serving support node operable to control communications of the internet packets to and/or from the gateway support node to and/or from the mobile user equipment to form the packet communications bearer, and a radio network part operable to provide a radio access bearer for communicating the internet packets via a radio access interface to and/or from the mobile user equipment, wherein in response to a packet data protocol activation request message requesting a common packet data protocol context, the serving support node is operable in combination with the gateway support node to establish a common packet data protocol context in association with a common packet communications bearer, the common packet data protocol context being established to communicate internet protocol packets via the common packet communications bearer, the common packet communications bearer being shared with at least one other communications session and being formed by the gateway support node and the serving support node using a common tunnelling protocol bearer, and the gateway support node is operable to communicate internet protocol packets via the common packet communications bearer for a plurality of communications sessions, at least one of the communications sessions using a different internet protocol version to another of the communications sessions, the common tunnelling protocol bearer being operable to communicate the internet packets for the plurality of communications sessions for the different internet protocol versions via the common packet communications bearer.

2. The mobile user equipment as claimed in claim 1, wherein the gateway support node is operable to establish the common communications bearer by forming the common tunnelling protocol bearer between the gateway support node and the radio network part via the serving support node, the common tunnelling protocol bearer being formed using a common tunnelling end point identifier for each of the mobile user equipment which are sharing the common packets communications bearer.

3. The mobile user equipment as claimed in claim 1, wherein the tunnelling protocol bearer is supported by an internet protocol transport layer, and the tunnelling protocol bearer is arranged to provide a quality of service to each of the communications sessions which are sharing the common tunnelling bearer based on a differential quality of service class provided in a header of the internet packets which are communicated in accordance with each of the communications sessions.

4. The mobile user equipment as claimed in claim 1, wherein the radio network part includes a radio access bearer filter operable to identify one of the radio access bearers which has been established for communicating the internet packets to and/or from the mobile user equipment in accordance with the communications sessions which has been established by the mobile user equipment, the radio access bearer filter being operable to identify the radio access bearer corresponding to the established communications session from a destination address of the internet packets being communicated to the mobile user equipment.

5. The mobile user equipment as claimed in claim 2, wherein the tunnelling protocol bearer is supported by an internet protocol transport layer, and the tunnelling protocol bearer is arranged to provide a quality of service to each of the communications sessions which are sharing the common tunnelling bearer based on a differential quality of service class provided in a header of the internet packets which are communicated in accordance with each of the communications sessions.

6. The mobile user equipment as claimed in claim 2, wherein the radio network part includes a radio access bearer filter operable to identify one of the radio access bearers which has been established for communicating the internet packets to and/or from the mobile user equipment in accordance with the communications sessions which has been established by the mobile user equipment, the radio access bearer filter being operable to identify the radio access bearer corresponding to the established communications session from a destination address of the internet packets being communicated to the mobile user equipment.

7. The mobile user equipment as claimed in claim 3, wherein the radio network part includes a radio access bearer filter operable to identify one of the radio access bearers which has been established for communicating the internet packets to and/or from the mobile user equipment in accordance with the communications sessions which has been established by the mobile user equipment, the radio access bearer filter being operable to identify the radio access bearer corresponding to the established communications session from a destination address of the internet packets being communicated to the mobile user equipment.

8. The mobile user equipment as claimed in claim 4, wherein the destination address of the internet packets with respect to which the corresponding radio access bearer is identified for the communications session is provided to the radio access bearer filter by the mobile user equipment.

9. The mobile user equipment as claimed in claim 4, wherein each of the radio access bearers is arranged to provide a quality of service for which the communications session has been established by the mobile user equipment.

10. The mobile user equipment as claimed in claim 6, wherein the destination address of the internet packets with respect to which the corresponding radio access bearer is identified for the communications session is provided to the radio access bearer filter by the mobile user equipment.

11. The mobile user equipment as claimed in claim 7, wherein the destination address of the internet packets with respect to which the corresponding radio access bearer is identified for the communications session is provided to the radio access bearer filter by the mobile user equipment.

12. The mobile user equipment as claimed in claim 8, wherein each of the radio access bearers is arranged to provide a quality of service for which the communications session has been established by the mobile user equipment.

\* \* \* \* \*